(No Model.)  5 Sheets—Sheet 1.
H. F. CRANDALL.
GRAIN BINDER.
No. 478,572.  Patented July 12, 1892.
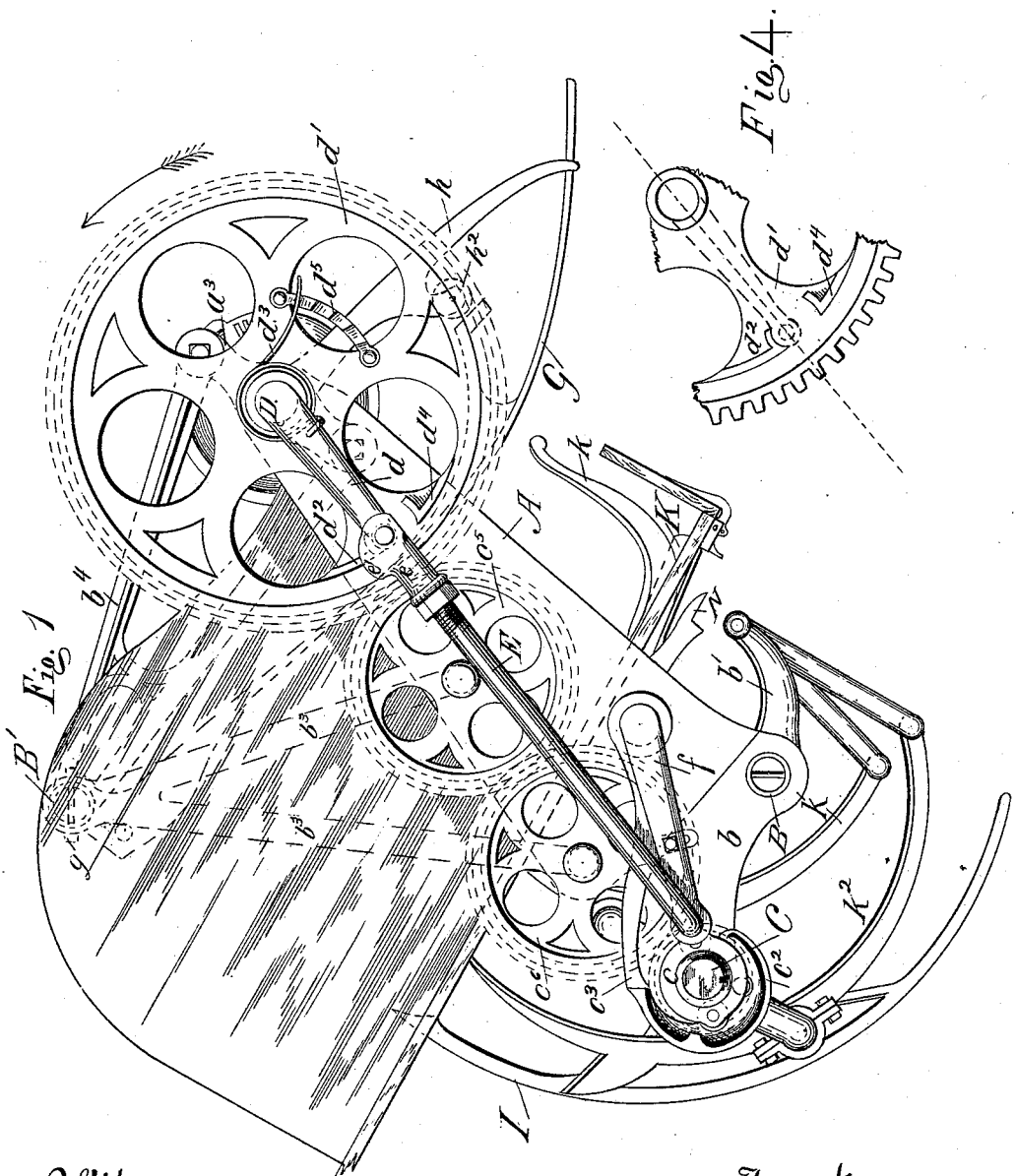

(No Model.)
5 Sheets—Sheet 2.
H. F. CRANDALL.
GRAIN BINDER.
No. 478,572.
Patented July 12, 1892.
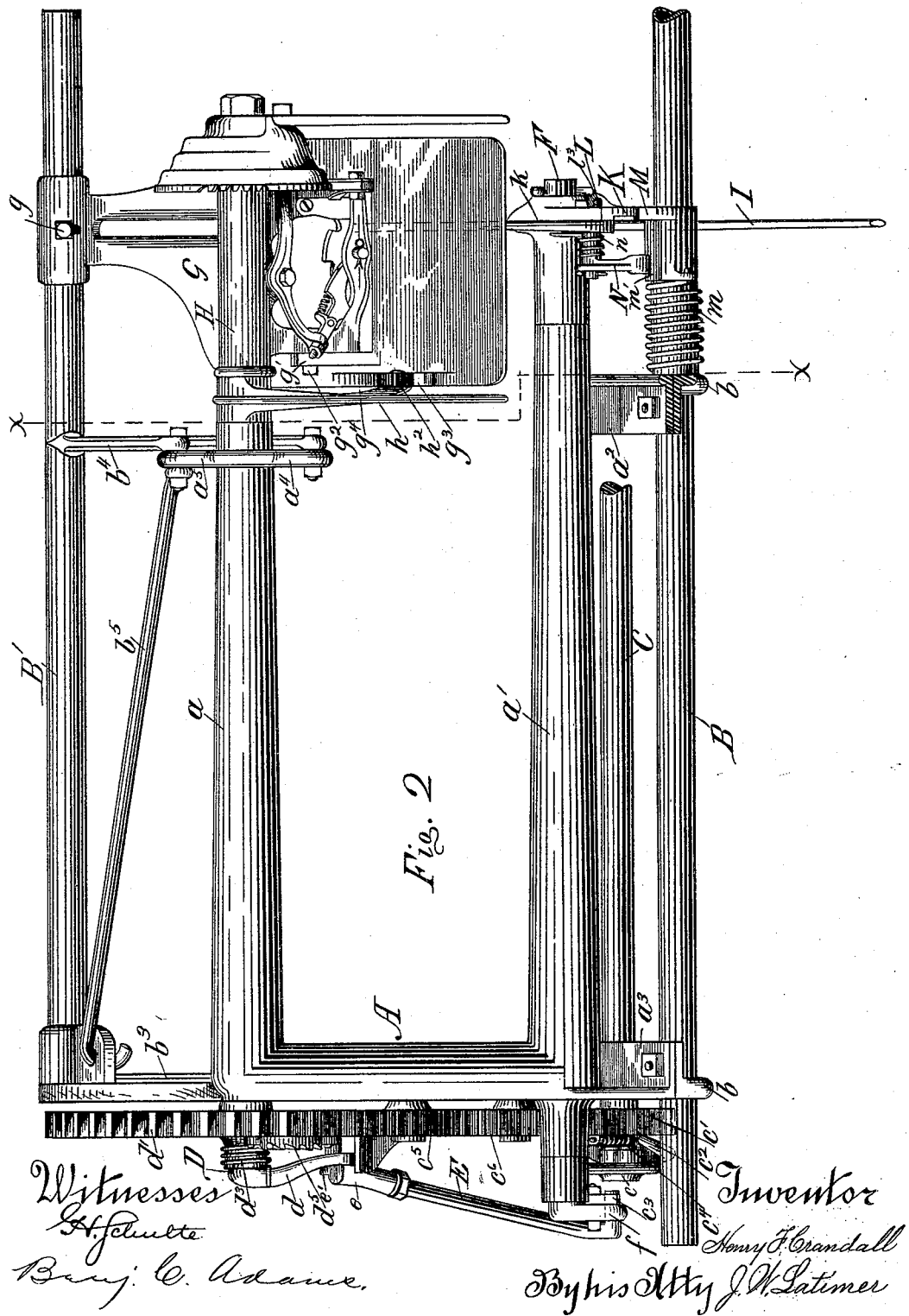

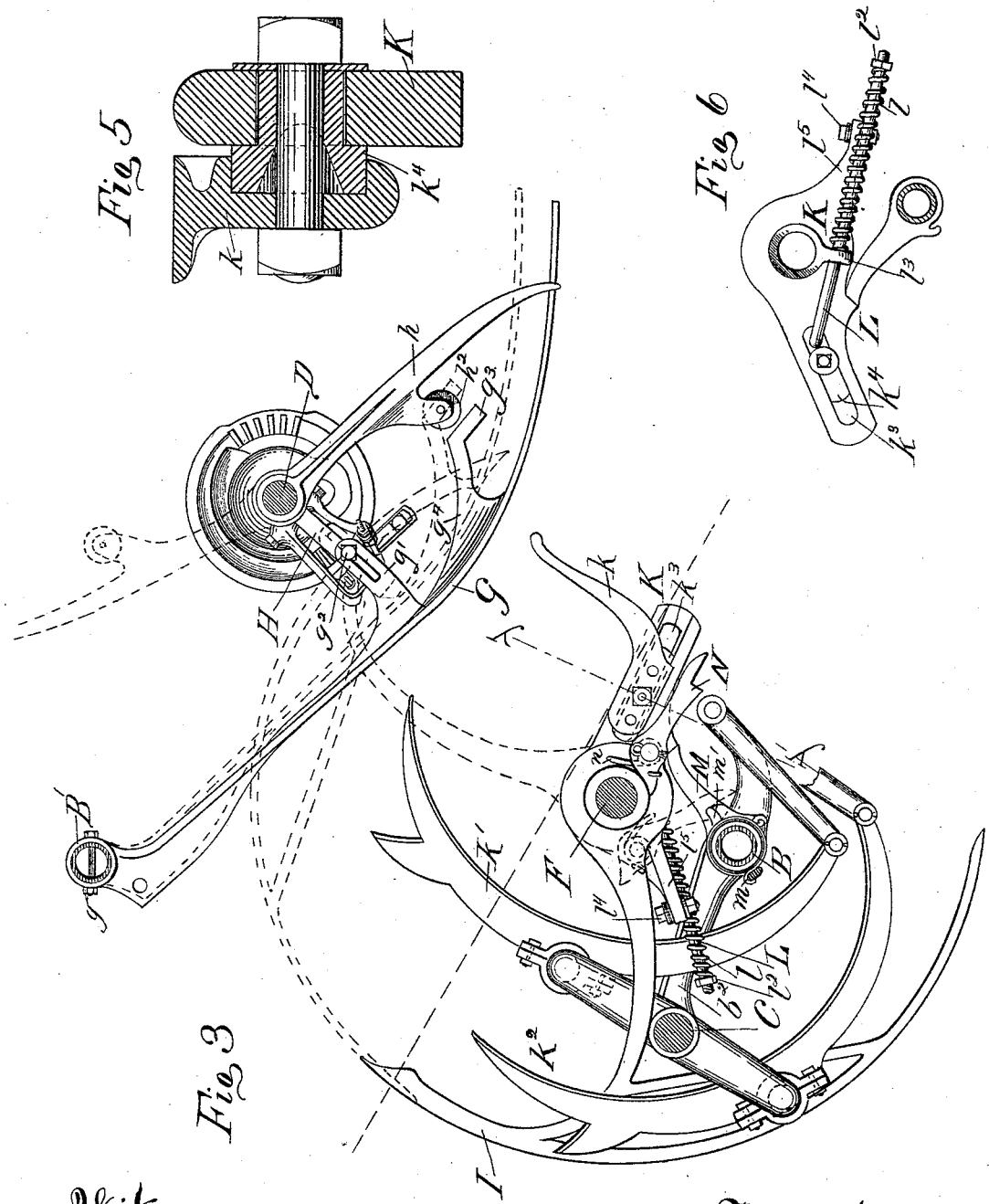

(No Model.) 5 Sheets—Sheet 4.
H. F. CRANDALL.
GRAIN BINDER
No. 478,572. Patented July 12, 1892.
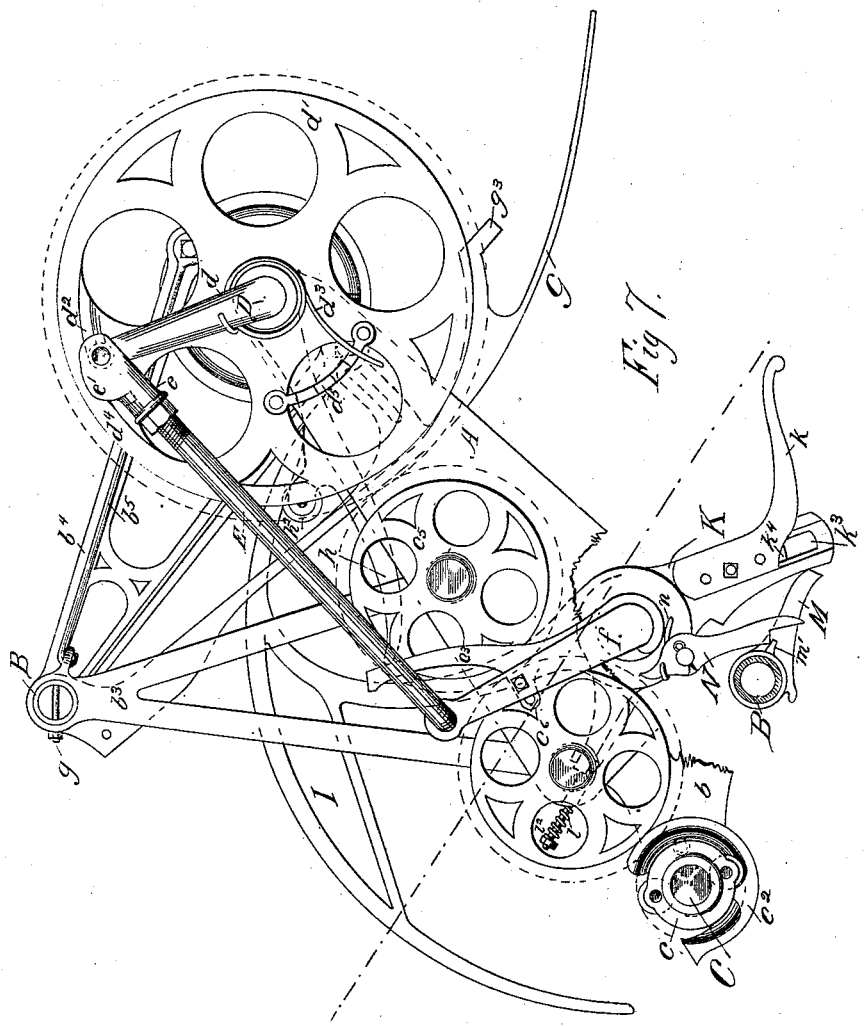

(No Model.) 5 Sheets—Sheet 5.

H. F. CRANDALL.
GRAIN BINDER.

No. 478,572. Patented July 12, 1892.

Witnesses
G. H. Schulte
Benj. L. Adams.

Inventor
Henry F. Crandall,
By his Atty J. W. Latimer

THE NORRIS PETERS CO., PHOTO-LITHO., WASHINGTON, D. C.

UNITED STATES PATENT OFFICE.

HENRY F. CRANDALL, OF MILWAUKEE, WISCONSIN, ASSIGNOR TO THE MILWAUKEE HARVESTER COMPANY, OF SAME PLACE.

GRAIN-BINDER.

SPECIFICATION forming part of Letters Patent No. 478,572, dated July 12, 1892.

Application filed December 29, 1890. Serial No. 376,136. (No model.)

*To all whom it may concern:*

Be it known that I, HENRY F. CRANDALL, a citizen of the United States, residing at Milwaukee, in the county of Milwaukee and State of Wisconsin, have invented certain new and useful Improvements in Grain-Binders; and I do hereby declare that the following is a full, clear, and exact description thereof, which will enable others skilled in the art to which it pertains to make and use the same, reference being had to the accompanying drawings, and to the letters of reference marked thereon, which form a part of this specification.

My invention relates to that class of grain-binders in which the grain as it is received from the harvester is formed into bundles or gavels between the breast-plate and binder-deck and against the compressor by the action of the packers, and in which the resistance of the accumulating grain against the tripping mechanism automatically sets the binding mechanism in operation.

The invention consists, essentially, first, of improved tripping mechanism for automatically starting the binding mechanism in operation at the proper time, comprising a yielding breast-plate arranged to act through the knotter-shaft to connect and disconnect the binding mechanism and its driving mechanism, and, second, of improved compressing mechanism and means for operating and controlling the same.

It also consists of certain novel details and combinations of parts, which, with the foregoing, will be fully hereinafter described, and finally pointed out in the claims.

In the accompanying drawings like letters designate the same parts in the several figures.

Figure 8:
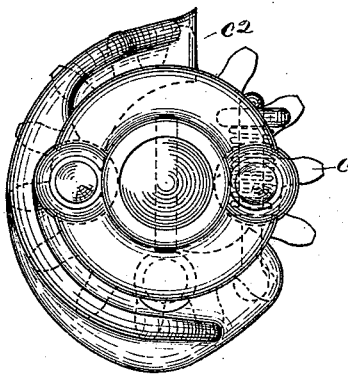
Figure 9:
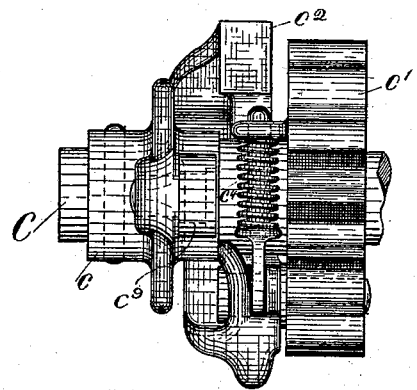
Figure 10:
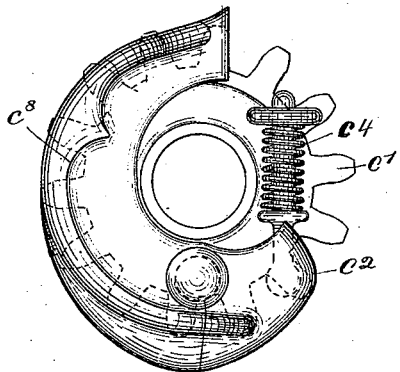
Figure 11:
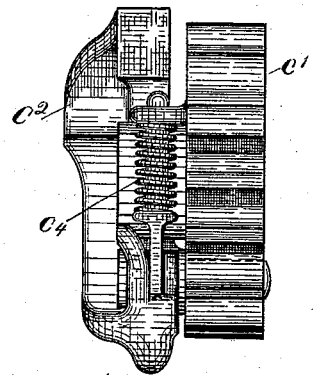
Figure 12:
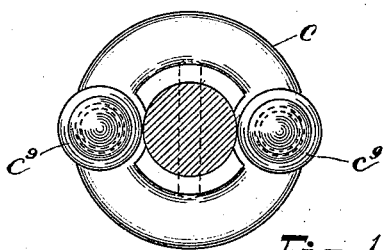
Figure 13:
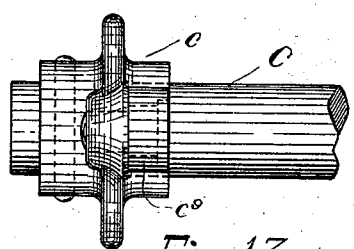

Figure 1 is an end view of so much of a grain-binder embodying my invention as is essential to an understanding thereof. Fig. 2 is an elevation viewed from the stubble or delivery side of the machine, the binder-deck and packers being removed. Fig. 3 is a vertical section on the line $x$ $x$, Fig. 2, viewed from behind the machine. Fig. 4 is a detail view of a portion of the driving wheel or gear on the knotter-shaft, showing the stops for limiting the independent movement of the knotter-shaft. Fig. 5 is a section on the line $y$ $y$, Fig. 3, showing the connection between the compressor-finger and the arm which carries it. Fig. 6 is a front view of the compressor detached from the binder; and Fig. 7 is an end elevation of the binder, parts of which are removed to disclose the compressor and its connections in position for the discharge of a bundle. Fig. 8 is an end view of the continuously-rotating driving-shaft and clutch mechanism. Fig. 9 is a side view of the same. Figs. 10 and 11 are, respectively, end and side views of the driving dog and pinion when removed from the driving-shaft. Figs. 12 and 13 are respectively end and side views of the driving-shaft with the driver pinned thereon.

In Fig. 2 of the drawings, A represents the main frame of the binder, constructed in the usual manner with two parallel tubular arms $a$ and $a'$, the former receiving the knotter-shaft and the latter the needle-shaft. Upon these arms are formed projections $a^2$, $a^3$, $a^4$, and $a^5$, to which are secured other parts of the frame-work. B is the lower pipe sill or support of the binder. It passes through and is secured to cross-sills $b$ and $b'$, which are bolted to projections $a^2$ and $a^3$ on the lower arm of the binder-frame. B' is the upper pipe sill or support of the binder. It lies parallel with $a$ arm $a$ and is secured to the main frame A by means of brackets $b^3$ $b^4$, bracket $b^4$ being bolted to projections $a^4$ and $a^5$ and bracket $b^3$ to the upright portion of said frame A. A diagonal brace $b^5$ connects the projection $a^5$ with the bracket $b^3$. C is a continuously-rotating driving-shaft, which receives its motion from some convenient part of the harvester. The inner end of this shaft, as shown in Fig. 3, is provided with the packer-cranks that operate the packers $k'$ and $k^2$, working upwardly through the binder-deck, one on each side of the needle I, and operating in the usual way to accumulate the grain into gavels for binding. Upon the rear or opposite end of shaft C is fixed the driver $c$, between which and the frame A upon said shaft is mounted a loose pinion $c'$, as shown in Figs. 1 and 2. Upon one side of the pinion $c'$ is pivoted the driving-dog $c^2$, which is held out of engagement with the driver c by trip-stop $c^3$, secured to the needle-crank $f$. When the needle-crank $f$ is raised, the trip-stop $c^3$ is disengaged from the driving-dog $c^2$, which is thrown into engagement with the driver c by means of a coil-spring $c^4$, and the binder mechanism is thus set in motion. The driver c, pinion $c'$, and the spring-actuated dog $c^2$ constitute a clutch by which the binding mechanism is connected and disconnected with the driving mechanism. The driving-dog $C^2$ is pivoted to the side of pinion $C'$ by means of shoulder-bolt $C^7$, the curved portion $C^8$ forming an inward projection upon the flange of the driving-dog, which engages with one or the other of the roulettes $C^9$ and $C^9$ upon the driver C, when the driving-dog is released by the trip-stop $C^3$, and thus sets the binding mechanism in motion. D is a knotter-shaft, which operates the knot-tying mechanism. It is provided with a crank $d$, which is connected by a pitman E with the needle-crank $f$ and through these connections operates the needle-shaft and needle. Upon the knotter-shaft D is loosely mounted a gear-wheel $d'$, which is driven from the pinion $c'$ through idle-gears $c^5$ and $c^6$. The gear-wheel $d'$ is provided on opposite sides of the crank $d$ with stops $d^2$ and $d^4$, which permit a limited movement of said crank $d$ independently of said gear-wheel $d'$ when the mechanism is in the position shown in Fig. 1. Crank $d$ is held normally in contact with the stop $d^2$ by means of a spring $d^3$, which is coiled about the hub of the gear-wheel $d'$, with one end engaging the crank and the other end one of a series of notches in rack $d^5$ on gear-wheel $d'$, whereby the yielding of the crank is regulated. The pitman-head $e$ is formed on one side with a cam or projection $e'$, which comes into contact with the stop $d^4$ and holds the crank $d$ in contact with the stop $d^2$, as shown in Fig. 7, thereby preventing the independent movement of the knotter-shaft while the needle is compressing a bundle.

Referring now to Fig. 3, G is the breast-plate, hinged by a sleeve at its upper end to the support $B'$, its outer end being free to rise and fall a limited distance. It is prevented from moving endwise of the pipe-support $B'$ by a bolt $g$, passing through a perforation in said support and circumferential slots in the sleeve on said breast-plate, and is connected with the knotter-frame H by a slotted arm $g'$, through which loosely passes a bolt $g^2$, fixed in said knotter-frame H. $h$ represents the inside discharge-arm secured to the knotter-shaft D between the end of the arm $a$ and the knotter-frame H, as seen in Fig. 2. It is provided on one side with a friction-roller $h^2$, which overhangs an upward projection $g^3$ on the adjacent side of the breast-plate. The projection $g^3$ of the breast-plate lies in the path of the roller $h^2$ and in contact with or just above it when the breast-plate is in its normal position, as shown in Fig. 3, so that when the pressure of the accumulating grain raises the breast-plate it operates to raise the discharge-arm $h$, which gives a partial rotation to the knotter-shaft D, and thereby starts the binding mechanism in operation. On its upper edge the projection $g^3$ is formed in the path of roller $h^2$, with a curved way or incline $g^4$, which the roller $g^3$ traverses as the discharge-arm completes a revolution, thereby depressing and returning the breast-plate to its normal position. The needle-shaft F, projecting through and beyond the hub of the needle, as shown in Fig. 2, serves as a bearing upon which the compressor-arm K is journaled. The compressor-arm K is formed with a slot $k^3$ for the reception of a sliding block $k^4$, to which the compressor-finger $k$ is bolted, as shown in detail in Fig. 5. A rod L, having a sliding bearing in a perforated ear $l^3$ on the hub of the compressor-arm K, as shown in Fig. 6, and surrounded by a coiled spring $l$, bearing at one end against said ear and at the other against an adjusting-nut $l^2$ on said rod, is connected with the block $k^4$ and permits the compressor-finger $k$ to yield in a line with the compression of a bundle by the needle. The tension of compressor-spring $l$ is regulated by the nut $l^2$. The compressor-finger $k$ is held in receiving position by means of a pawl M, which is journaled upon the pipe-sill B and held in contact with the compressor-arm K by a coiled spring $m$, as shown in Figs. 2 and 3. To one end of the needle-hub is pivoted a pawl N, the outer end of which, held normally by a spring $n$ in a path cutting a projection $m'$ on the hub of pawl M, is allowed by said spring to yield and pass over said projection when the needle advances to the knotter, as indicated by dotted lines in Fig. 3; but when the needle begins its return movement said pawl N is caused to engage with said projection $m'$ and turn the pawl M out of engagement with the compressor-arm K, thereby permitting the compressor-arm and finger $k$ to fall, as shown in Fig. 7, and the bundle to be discharged. A projection $l^5$ of the compressor-arm K is provided in the path of the needle I with an adjusting-bolt $l^4$, (shown in Figs. 3 and 6,) by engagement with which the needle descending returns the compressor arm and finger to receiving position. The bolt $l^4$, adjustable toward and from the needle, serves to maintain the proper relative positions of the compressor-arm and pawl M when the sweep of the needle is changed.

My improved binder operates as follows: The grain as it is received from the harvester is accumulated against the compressor-finger $k$ and underneath the breast-plate G by the action of the packers $k'$ and $k^2$ until a sufficient quantity has been collected to force the breast-plate upward, as indicated by dotted lines in Fig. 3. The upward movement of the breast-plate raises the discharge-arm $h$ and turns the knotter-shaft D a short distance, causing the crank $d$ to move toward the stop $d^4$ on gear-wheel $d'$. This movement of the crank $d$ raises the needle-crank $f$ by means of pitman E and withdraws the trip-stop $c^3$ from engagement with the dog $c^2$, which thereupon drops into gear with the driver $c$, thereby connecting the binding mechanism with the continuously-revolving shaft C. The stop $d^2$ on gear-wheel $d'$, revolving in the direction indicated by the arrow in Fig. 1, engages with the crank $d$ and raises the needle, as indicated by dotted lines in Fig. 3, to compress the grain and to place the twine in the knotter. By the revolution of the gear-wheel $d'$ the cam or projection $e'$ on the pitman-head $e$ is brought into contact with stop $d^4$, which holds the crank $d$ against the stop $d^2$, as shown in Fig. 7, while the compression of the bundle takes place. When the needle is raised into its upper position, as indicated by dotted lines in Fig. 3, the pawl N drops behind the projection $m'$ on the pawl M. Now as the movement of the needle is reversed and it begins to descend below the binder-deck it carries pawl N into engagement with the projection $m'$ on pawl M, forcing the latter out of engagement with the compressor-arm K, which is thus permitted to drop with the compressor-finger $k$, as shown in Fig. 7, out of the way of the bundle, which is thereupon discharged by the arms $h$ and $h'$. As the needle approaches its starting-point or lowest position it engages with the bolt $l^4$ and returns the compressor-arm K, with the the finger $k$, to receiving position, as shown in Fig. 3, where it is locked by the pawl M, thrown into engagement therewith by spring $m$.

I wish it to be understood that I do not intend to limit myself to the exact construction and arrangement of parts herein shown and described, as it is evident that many changes may be made without departing from the spirit of my invention.

I claim—

1. In a grain-binder, the combination of a continuously-rotating driving-shaft, a knotter-shaft provided with a crank-arm, a wheel loosely mounted upon the knotter-shaft and provided with a stop adapted to engage with said crank-arm, and through it drive the knotter-shaft, a pinion loosely mounted upon the continuously-rotating shaft, an intermediate gear connecting the pinion with said wheel, a clutch for connecting the driving mechanism with said pinion, a trip-arm connected with the knotter-shaft crank and controlling said clutch, and a yielding part exposed to the pressure of the grain in the binder and arranged to turn the knotter-shaft and through it operate said trip, substantially as and for the purpose set forth.

2. In a grain-binder, the combination of the knotter-shaft provided with a crank-arm, a continuously-rotating driver, a wheel loosely mounted on the knotter-shaft and provided on opposite sides of its crank-arm with stops, permitting a limited independent movement of the knotter-shaft, one stop serving to drive the knotter-shaft and the other to limit its independent advance movement, a clutch for connecting said wheel with the driver, a trip connected with the knotter-shaft and controlling said clutch, and a yielding part exposed to the pressure of grain accumulating in the binder and arranged to turn the knotter-shaft and through it operate said trip, substantially as and for the purposes set forth.

3. In a grain-binder, the combination, with the binding mechanism, of a yielding breast-plate, a driving-pinion mounted upon a driving-shaft and held out of engagement with its motor by means of a trip-arm, a knotter-shaft having a crank-and-pitman connection with said trip-arm, and an arm projecting from the knotter-shaft and overhanging the breast-plate, whereby the pressure of the grain against the breast-plate imparts a partial rotation to the knotter-shaft and trips the machine into action, substantially as and for the purposes set forth.

4. In a grain-binder, the combination of a breast-plate arranged to yield by the pressure of the grain in the binder and thereby actuate the knotter-shaft by means of an arm projecting therefrom, the knotter-shaft provided with a crank having a pitman connection with the needle-crank and trip-arm, a gear-wheel loosely mounted upon the knotter-shaft and provided with a stop engaging the crank and operating said knotter-shaft, a spring for holding the crank in engagement with said stop, whereby the knotter-shaft crank is permitted to move a limited distance in advance of the gear-wheel when actuated by the yielding of the breast-plate, and a stop for limiting the independent advance movement of said crank, substantially as and for the purposes set forth.

5. In a grain-binder, the combination of the knotter and needle shafts provided with cranks, a pitman connecting said cranks, a continuously-rotating driver, a wheel loosely mounted on the knotter-shaft and provided with stops on opposite sides of the knotter-shaft crank, one stop serving to drive the knotter-shaft and the other to limit its independent advance movement, a spring holding said crank normally in engagement with the driving-stop, a projection on the pitman-head arranged to engage with the limiting-stop and hold the crank during the operation of compressing and binding the bundle in engagement with the driving-stop and prevent the backward yielding of the needle, a clutch for connecting the driver with the binding mechanism, a trip connected with the knotter-shaft and controlling said clutch, and a yielding part exposed to the pressure of grain in the binder and arranged to turn the knotter-shaft and through it to operate the clutch-trip, substantially as and for the purposes set forth.

6. In a grain-binder, the combination of the knotter-shaft provided with an arm, a continuously-rotating driver, a clutch for connecting the driver with the binding mechanism, a trip connected with the knotter-shaft and controlling said clutch, and a yielding breast-plate provided with a projection in the path of the arm on the knotter-shaft, whereby the movement of said breast-plate produced by the pressure of grain in the binder is imparted to the arm on the knotter-shaft, which operates the clutch-trip, substantially as and for the purposes set forth.

7. In a grain-binder, the combination of the knotter-shaft having an arm provided with a friction-roller, a continuously-rotating driver, a clutch for connecting the driver with the binding mechanism, a trip connected with the knotter-shaft and controlling said clutch, and a yielding breast-plate provided in the path of said friction-roller with an incline or camway by which the breast-plate is returned to its normal position by the revolution of the knotter-shaft in discharging a bundle, substantially as and for the purposes set forth.

8. In a grain-binder, the combination of a yielding breast-plate pivoted to the frame of the machine and having an adjustable connection with the knotter-frame, a discharge-arm secured to the knotter-shaft and provided with a roller which normally overhangs the breast-plate, whereby the upward movement of the breast-plate raises the discharge-arm, which actuates the knotter-shaft to trip the binder-driving mechanism into action, and whereby the revolution of the discharge-arm returns the breast-plate to its normal position, substantially as and for the purposes set forth.

9. In a grain-binder, the combination, with the needle, of a compressor hinged to a suitable support, so as to be swung into and out of the path of the grain in the binder, a locking pawl or arm adapted to engage with and hold said compressor in working position, and a tripping-pawl pivoted to and moving with the needle and arranged when the needle descends to engage with said locking pawl or arm and throw the same out of engagement with the compressor, substantially as and for the purposes set forth.

HENRY F. CRANDALL.

Witnesses:
G. H. SCHULTE,
BENJ. C. ADAMS.